United States Patent [19]

Wendschlag

[11] 4,391,104

[45] Jul. 5, 1983

[54] CASCADE HEAT PUMP FOR HEATING WATER AND FOR COOLING OR HEATING A COMFORT ZONE

[75] Inventor: James C. Wendschlag, Onalaska, Wis.

[73] Assignee: The Trane Company, La Crosse, Wis.

[21] Appl. No.: 339,540

[22] Filed: Jan. 15, 1982

[51] Int. Cl.³ .......................... F25B 27/02; F25B 7/00
[52] U.S. Cl. ........................ 62/79; 62/238.6; 62/335
[58] Field of Search ............... 237/2 B; 62/238.6, 175, 62/79, 335, 238.7

[56] References Cited

U.S. PATENT DOCUMENTS

| | | | |
|---|---|---|---|
| 2,204,394 | 6/1940 | Bailey | 237/2 B X |
| 3,301,002 | 1/1967 | McGrath | 62/175 |
| 3,984,050 | 10/1976 | Gustafsson | 237/2 |
| 4,149,389 | 4/1979 | Hayes et al. | 62/335 X |
| 4,325,226 | 4/1982 | Schaeffer | 62/238.6 |

*Primary Examiner*—William E. Wayner

*Attorney, Agent, or Firm*—Carl M. Lewis; Ronald M. Anderson; Raymond W. Campbell

[57] ABSTRACT

A heat pump system and method, wherein the system may be operated in cascade fashion to heat water using heat extracted from relatively cold outdoor ambient air, or in non-cascade fashion to provide supplemental heating or cooling in a comfort zone. The system uses a first and a second refrigerant fluid with separate compression cycle loops passing in heat transfer relationship through a tri-fluid heat exchanger. In a first mode of operation, the first refrigerant fluid condensed while heating water is vaporized in the tri-fluid heat exchanger to cool air supplied to the comfort zone, and in a second mode the first refrigerant fluid is vaporized by heat rejected from condensing the second refrigerant fluid. In a third mode, wherein only the second refrigerant loop is operative, air passing through the tri-fluid heat exchanger to the comfort zone is heated by condensation of the compressed second refrigerant fluid.

15 Claims, 6 Drawing Figures

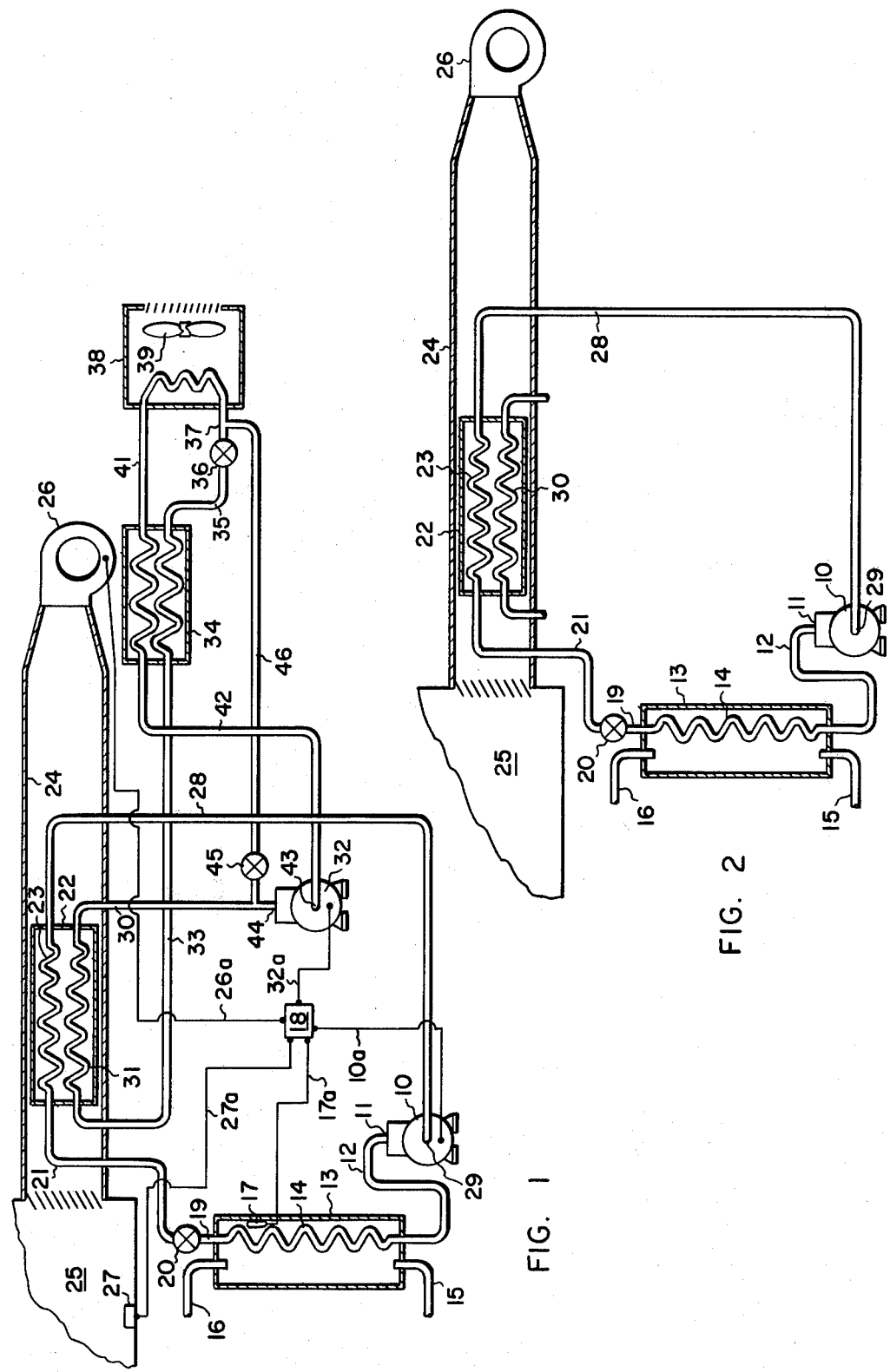

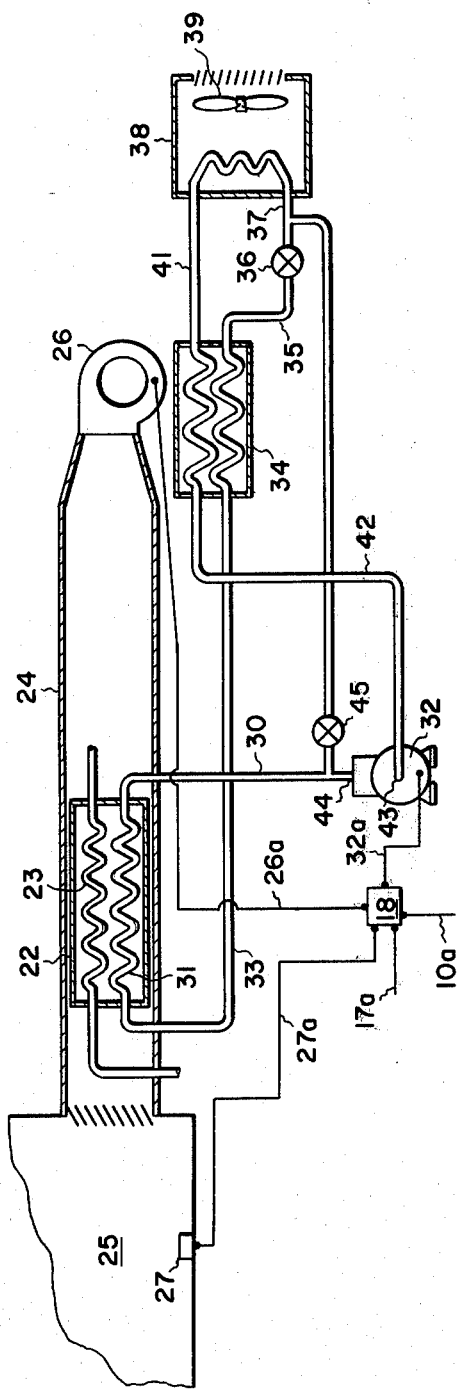
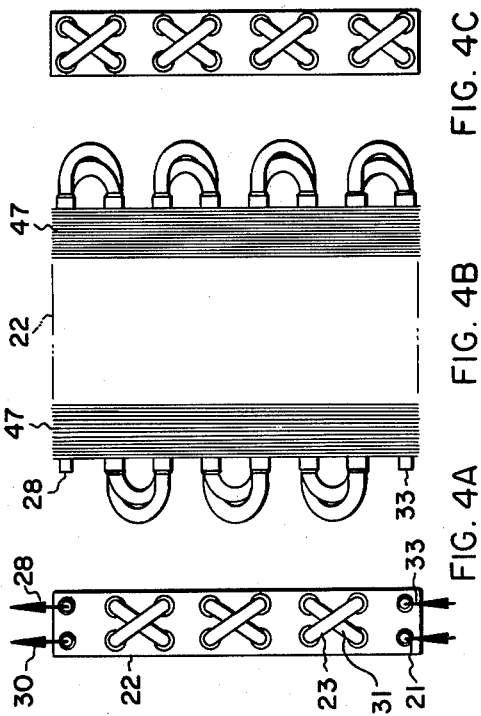
FIG. 3
FIG. 4A
FIG. 4B
FIG. 4C

CASCADE HEAT PUMP FOR HEATING WATER AND FOR COOLING OR HEATING A COMFORT ZONE

TECHNICAL FIELD

This invention generally pertains to a heat pump water heating system, and specifically, a system using two refrigerant fluids, selectively operable in cascade fashion to heat water and in non-cascade fashion to temperature condition air supplied to a comfort zone.

BACKGROUND ART

A heat pump water heater system potentially has a much lower operating cost than a system using electric resistance heating or one in which high priced fossil fuel is burned. Since a heat pump can extract heat energy from a water source or form outdoor ambient air, it may use as little as ⅓ the electrical energy required by electrical resistance heating. However, the efficiency of a typical heat pump system for heating either water or air drops substantially as the temperature of the heat source falls below the optimum range for which the system is designed. For example, a conventional single stage heat pump system using refrigerant fluid R-22 has an efficiency less than that of electric resistance heating, if the source temperature falls below approximately 20° F.

Although refrigerants other than R-22 may be used in a heat pump water heater system to extract energy from a heat source of much lower temperature, such systems do not produce very hot water, nor operate efficiently at higher source temperatures. For applications in which a heat pump must extract heat from a source of variable temperature, it is common practice to design the system for relatively higher source temperatures and to provide backup or auxiliary heat in the form of electric resistance elements or fossil fuel burners, for use when the source temperature drops below an economic balance point.

An alternative solution to this problem is disclosed in U.S. Pat. No. 3,301,002 wherein two compressors are staged and operated as a primary and secondary refrigerant loop. The secondary system may be operated to heat water while the primary system is inoperative, or both may be operated to temperature condition air supplied to a comfort zone and to heat water, over a wide range of ambient air temperatures.

A system capable of extracting heat from relatively low temperature ambient air (−10° C.) to produce hot water (up to 80° C.) is disclosed in U.S. Pat. No. 3,984,050. This system includes two compressors which are cascade coupled, with the evaporator of one serving to condense refrigerant fluid from the other. Water heated in the system is supplied both to radiators disposed to heat a plurality of comfort zones, and to a potable water heater.

An economical water heating system is particularly important in commercial applications such as hospitals and restaurants which often require significant quantities of hot water for use in laundry or washing facilities. A heat pump water heating system is a logical choice for such applications, however, the system should be capable of operating over a wide range of source temperature. Since the initial cost of such a system is significant compared to other types of water heaters, it should also provide supplemental comfort zone temperature conditioning, further reducing its pay-back period.

In consideration of the foregoing, it is an object of this invention to provide a heat pump system capable of heating water using heat extracted from a source of variable temperature.

It is a further object of this invention to provide supplemental heating and cooling in a comfort zone.

A still further object is to provide common means for heating or cooling air supplied to a comfort zone and for transferring heat between a first and a second refrigerant fluid in a cascade heat pump water heater system.

These and other objects of the invention will be apparent from the description of the preferred embodiment of the invention which follows and from the attached drawings.

DISCLOSURE OF THE INVENTION

The subject invention is a heat pump system and a method for selectively heating water by extracting heat from relatively cold outdoor ambient air (or other source) while operating in cascade fashion, and for heating or cooling air supplied to a comfort zone while operating in non-cascade fashion. This system is selectively operable in three modes: (1) heating water while cooling air supplied to the comfort zone; (2) heating water using heat extracted from relatively cold outdoor ambient air; and (3) heating air supplied to the comfort zone using heat extracted from the outdoor ambient air. In modes 1 and 3, the system operates in non-cascade fashion.

The heat pump system includes a first and a second refrigerant loop. The first comprises a first compressor, a refrigerant-to-water heat exchanger, first expansion means, and a tri-fluid heat exchanger. Compressed first refrigerant fluid is condensed in the refrigerant-to-water heat exchanger, thereby heating water during operation of the system in the first and second modes. The first expansion means reduce the pressure of the condensed first refrigerant fluid so that it may be vaporized in the tri-fluid heat exchanger by heat transfer with the air supplied to the comfort zone during operation in the first mode, or with a second refrigerant fluid during operation of the system in the second mode.

A second refrigerant fluid loop comprises a second compressor, second expansion means, and an outdoor heat exchanger. The second compressor is energized in the second and third modes and is connected to the tri-fluid heat exchanger wherein the compessed second refrigerant fluid is condensed. The condensing second refrigerant fluid thus heats air supplied to the comfort zone when only the second compressor is energized during operation in the third mode. Condensed second refrigerant fluid is expanded in the second expansion means and vaporized in the outdoor heat exchanger by heat transfer with outdoor ambient air. The system is thus able to efficiently transfer heat extracted from relatively cold outdoor air to heat water by operating the first and second refrigerant loops in cascade fashion, or to heat or cool air supplied to the comfort zone.

BRIEF DESCRIPTION OF THE DRAWINGS

FIG. 1 is a schematic representation of the subject heat pump system, showing both first and second refrigerant fluid loops, which are operable in cascade fashion.

FIG. 2 shows the portion of the system operable in a first mode to heat water and cool air supplied to a comfort zone.

FIG. 3 shows the portion of the system, operable in a third mode to heat air supplied to the comfort zone.

FIGS. 4A, 4B, and 4C illustrate a preferred embodiment of the tri-fluid (double circuited fin and tube) heat exchanger.

DESCRIPTION OF THE PREFERRED EMBODIMENT

With reference to FIG. 1, a first and a second refrigerant fluid loop are shown connected in cascade fashion. A first compressor 10 is operative to discharge a first refrigerant fluid through first discharge port 11 into a conduit 12 connected to a refrigerant-to-water heat exchanger 13. The compressed first refrigerant fluid is condensed as it flows through a condenser coil 14, disposed within heat exchanger 13, thereby heating water which enters through inlet 15. Heated water is withdrawn through hot water line 16, as required for use in the facility in which the heat pump system is installed.

The condensed first refrigerant fluid leaves heat exchanger 13 as a liquid through conduit 19 which is connected to an expansion valve 20. Expansion valve 20 throttles the flow of condensed first refrigerant fluid, allowing it to expand as it flows into a conduit 21, so that it is vaporized as it flows through an evaporator coil 23 in tri-fluid heat exchanger 22. Vaporized first refrigerant fluid travels through a conduit 28 back to a first suction port 29 on the first compressor 10.

Tri-fluid heat exchanger 22 is disposed within an air delivery duct 24, in heat exchange relationship with air supplied to a comfort zone 25 during operation of the system in mode 1 (Ref. FIG. 2). A centrifugal blower 26 provides the airflow through duct 24, drawing in air either from a return air plenum (not shown) or fresh air from outside the building, or supplying a mixture of fresh and return air.

In a second mode of operation, a compressed second refrigerant fluid supplied through a conduit 30 passes through a condenser coil 31, which is also disposed in tri-fluid heat exchanger 22, in heat transfer relationship with evaporator coil 23. The second refrigerant fluid is thus condensed and the first refrigerant fluid is vaporized. Condensed second refrigerant fluid thereafter passes through a conduit 33 to a liquid suction line subcooler 34 wherein it is cooled at constant pressure, and out through conduit 35. A second expansion valve 36 throttles the liquid second refrigerant fluid passing through conduit 35, and allows it to expand as it enters a conduit 37. The expanding second refrigerant fluid is vaporized by heat transfer with air passing through an outdoor ambient air heat exchanger 38. Airflow through the outdoor ambient air heat exchanger 38 is provided by a fan 39; in mode 2, airflow through heat exchanger 22 is preferably not provided. Vaporized second refrigerant fluid returns to the subcooler 34 through a conduit 41, is superheated by heat from the condensed second refrigerant fluid, and then returns through a conduit 42 to a suction port 43 on the second compressor 32.

Operation of the system in mode 2 to heat water using energy extracted from relatively cold outdoor ambient air is likely to result in a frequent requirement for defrost of the outdoor ambient air heat exchanger 38 to melt frost and ice accumulated on its surface. When it is necessary to defrost heat exchanger 38, hot compressed second refrigerant vapor discharged from a second discharge port 44 on second compressor 32 is supplied through a valve 45 to conduit 37 to melt the accumulated frost and ice as the refrigerant vapor condenses. Fan 38 is de-energized during the defrost cycle. This hot gas defrost method is well known by those skilled in the art. Valve 45 may be controlled as a function of various parameters used to sense the requirement for defrost or on a time interval basis.

Turning now to FIG. 3, only the portion of the heat pump system comprising the second refrigerant fluid loop is shown. This portion of the circuit is active during operation of the system in mode 3, in which air supplied to comfort zone 25 through duct 24 is heated by condensing second refrigerant fluid in the tri-fluid heat exchanger 22. During operation in mode 3, the first compressor 10 is de-energized, and the first refrigerant fluid loop is inactive. Instead of heat transfer between the first and second refrigerant fluid, air passing through tri-fluid heat exchanger 22 is heated by energy given up due to the condensation of the second refrigerant fluid passing through condenser coils 31. Operation of the second refrigerant fluid loop is otherwise the same in mode 3 as in mode 2.

Selective control of the heat pump system in one of the first, second, and third modes, is effected by control means which include control 18. Control 18 is provided with inputs from a water temperature sensor 17 disposed within refrigerant-to-water heat exchanger 13, and a comfort zone temperature sensor 27. Sensors 17 and 27 are connected to control 18 by leads 17a and 27a, respectively. Control leads 10a, 26a, and 32a likewise connect the control 18 with the first compressor 10, the centrifugal fan 26, and the second compressor 32, respectively. Control 18 is operative to energize first compressor 10 and centrifugal fan 26 in the first mode, if water temperature sensor 17 and comfort zone temperature sensor 27 indicate a concurrent demand for hot water and cooling in the comfort zone. Since it is intended that the subject heat pump system primarily provide hot water and only supplemental heating and cooling in comfort zone 25, control 18 does not effect the first mode of operation to cool the comfort zone 25 unless there is also a demand for heating water in the refrigerant-to-water heat exchanger 13. Therefore, it is expected that comfort zone 25 would have other primary means for temperature conditioning, and not depend solely upon the water heating heat pump system for this purpose.

Typically, comfort zone 25 should not require a supply of cooled air during periods of the year when the outdoor ambient temperature is relatively low. It is also during such periods of low outdoor ambient air temperature that a conventional single stage heat pump system is incapable of meeting a demand for heating water or heating a comfort zone using energy extracted from the relatively cold air. Under these circumstances, control 18 is operative to effect operation of the heat pump system in either modes 2 or 3. Control 18 effects mode 2 in response to a demand for water heating determined by sensor 17 when there is not a concurrent demand for cooling as determined by comfort zone temperature sensor 27. It should be clear, that control 18 will effect mode 1 instead of mode 2 if there is a demand for cooling in comfort zone 25 regardless of the outdoor ambient air temperature.

During periods of time when there is not a demand for water heating, control 18 may effect mode 3, energizing second compressor 32 and centrifugal blower 26 to heat air supplied to comfort zone 25, in response to a demand for heat in the comfort zone. At any time a demand for water heating occurs during operation of the heat pump system in mode 3, control 18 terminates mode 3 and effects mode 2. In mode 2, control 18 energizes first and second compressors 10 and 32, but normally does not energize blower 26.

Several factors must be considered in selecting the first and second refrigerant fluids for use in the heat pump system. These include the range of outdoor ambient air temperatures from which the system is expected to extract energy for heating air and water, and the maximum temperature to which the water is to be heated. Although other refrigerant fluids might be used, in the preferred embodiment, it is expected that the first refrigerant fluid would be selected from the group consisting of refrigerant 12 and refrigerant 22 (Dichlorodifluoromethane R-12, and Chlorodifluoromethane R-22), and that the second refrigerant fluid used in the second or low temperature loop would be selected from the group consisting of refrigerant 13B1, refrigerant 32, refrigerant 502, and refrigerant 504 (Bromotrifluoromethane R-13B1; Methylene Fluoride R-32; an azeotrope of R-22 and Chloropentafluoroethane R-502; and an azeotrope of Methylene Fluoride and Chloropentafluoroethane R-504). A typical application would use R-22 as the first refrigerant fluid and R-13B1 as the second refrigerant fluid. If R-12 is used as the first refrigerant fluid, R-22 might also be used as the second refrigerant fluid.

The group of refrigerants from which the second refrigerant fluid is selected should have a relatively high gas density for operation at relatively low ambient temperatures, thus permitting the use of a relatively small displacement second compressor 32. In addition, the second refrigerant fluid should have a vapor pressure at temperatures corresponding to high outdoor ambient which is sufficiently low so that specially designed high pressure components are not required. R-13B1, R-32, R-502, and R-504 all meet these requirements.

Referring now to FIGS. 4A, 4B, and 4C, a tube and fin heat exchanger circuited in a manner suitable for use as the tri-fluid heat exchanger 22 is disclosed, having common fin material 47 extending between first refrigerant fluid evaporator coils 23 and second refrigerant fluid condenser coils 31. The common fin material 47 not only provides heat transfer between coils 23 and 31 but also defines air passages through heat exchanger 22 through which air supplied to comfort zone 25 may pass in heat transfer relationship with the first or second refrigerant fluid. As shown in FIGS. 4A and 4C, coils 23 and 31 alternate across the face of heat exchangers 22, with ends of each coil separately connected by means of a plurality of U-bends, at each side. Airflow passes through heat exchanger 22 in a direction normal to the surface exposed in FIG. 4B, that surface being oriented transverse to the longitudinal axis of duct 24.

It should be noted that the cross-sectional area required for tri-fluid heat exchanger 22 may exceed that available in duct 24. An enlarged duct may be provided for mounting heat exchanger 22, or a dual circuited heat exchanger of smaller cross-sectional area, having more than two rows of tubes may be used. However, consideration must also be given to the possibility that heat exchanger 22 may excessively restrict airflow through duct 24 if it is too deep, i.e., if it has too many tube rows.

In the preferred embodiment disclosed above, ambient air serves as a source of energy for heating water, or air supplied to comfort zone 25; yet other sources of heat energy might also be used, including ground water from lakes, ponds, or wells, or waste energy available from industrial processes. Minor modifications may also be made to the system, as for example, capillary tubes may be used in place of expansion valves 20 and 36. While the subject invention has been described with respect to the preferred embodiment, it is to be understood that these and further modifications thereto would be apparent to those skilled in the art, which modifications lie within the scope of the present invention as defined in the claims which follow.

I claim:

1. A heat pump system selectively operable in cascade fashion for heating water and in non-cascade fashion, for heating or cooling air, comprising
   a. a first compressor selectively operative to compress a first refrigerant fluid, and including a first suction port and a first discharge port;
   b. a refrigerant-to-water heat exchanger connected in fluid communication with the first discharge port and operative to transfer heat from the first refrigerant fluid compressed in the first compressor, to water, thereby condensing the first refrigerant fluid and heating the water;
   c. first expansion means, in fluid communication with the refrigerant-to-water heat exchanger, for expanding and reducing the pressure of the condensed first refrigerant fluid;
   d. a tri-fluid heat exchanger including non-communicating first and second circuits and air passages arranged to provide heat transfer between the first refrigerant fluid, a second refrigerant fluid, and air, respectively; an inlet to said first circuit being connected in fluid communication to the first expansion means, and an outlet from said first circuit being connected in fluid communication with the first suction port for return of the first refrigerant fluid vaporized in said tri-fluid heat exchanger to the first compressor;
   e. a second compressor selectively operative to compress the second refrigerant fluid, including a second suction port, and a second discharge port connected in fluid communication with an inlet to said second circuit in the tri-fluid heat exchanger;
   f. second expansion means connected to an outlet from said second circuit, for expanding and reducing the pressure of the second refrigerant fluid condensed in the tri-fluid heat exchanger; and
   g. an evaporator heat exchanger, connected in fluid communication between said second expansion means, and said second suction port, operative to provide heat transfer with a source of heat to vaporize the second refrigerant fluid prior to its return to the second compressor, said system being used in a first mode to heat the water and cool the air when only the first compressor is selectively energized, or in a second mode to heat the water when both the first and second compressors are selectively energized, in cascade relationship, or, in a third mode, to heat the air when only the second compressor is energized.

2. The heat pump system of claim 1 wherein the source of heat to vaporize the second refrigerant fluid is outdoor ambient air; and wherein the air cooled or heated in modes one and three by heat transfer in the tri-fluid heat exchanger is supplied to a comfort zone.

3. A heat pump system for selectively heating water by extracting heat from relatively cold outdoor ambient air while operating in cascade fashion, and heating or cooling air supplied to a comfort zone, comprising
   a. a first refrigerant fluid loop including i. a first compressor selectively operative to compress a first refrigerant fluid, including a first suction port and a first discharge port;

ii. a refrigerant-to-water heat exchanger connected in fluid communication with the first discharge port, wherein water is heated and the compressed first refrigerant fluid is condensed as a result of heat transfer therebetween when the system is operated in a first or a second mode;

iii. first expansion means connected to the refrigerant-to-water heat exchanger, for expanding and reducing the pressure of the condensed first refrigerant fluid;

iv. a tri-fluid heat exchanger connected in fluid communication with the first expansion means, including non-communicating first and second circuits, and air passages, in heat transfer relationship with each other; said expanding first refrigerant fluid being vaporized while flowing through the first circuit, by heat transfer with air flowing through the air passages, thereby cooling the air when the system is operating in the first mode, and by heat transfer with a second refrigerant fluid when the system is operating in the second mode; said first circuit also being in fluid communication with the first suction port, whereby vaporized first refrigerant fluid is returned to the first compressor;

b. a second refrigerant fluid loop including i. a second compressor selectively operative to compress the second refrigerant fluid, and including a second suction port, and a second discharge port connected in fluid communication with the second circuit in the tri-fluid heat exchanger, said second compressor being selectively energized in the second mode, placing the first and the second refrigerant fluid loops in cascade relationship with each other, whereby heat transfer between the first and second refrigerant fluids in the tri-fluid heat exchanger vaporizes the first refrigerant fluid and condenses the second refrigerant fluid, and being selectively energized in a third mode wherein heat transfer between the compressed second refrigerant fluid and air in the tri-fluid heat exchanger heats the air and condenses the second refrigerant fluid;

ii. second expansion means connected in fluid communication to the tri-fluid heat exchanger second circuit, for expanding and reducing the pressure of the second refrigerant fluid condensed therein;

iii. an outdoor heat exchanger connected in fluid communication with the second expansion means and operative to provide heat transfer between the expanding second refrigerant fluid and outdoor ambient air when the system is operating in the second and third modes, whereby heat is extracted from the outdoor ambient air to vaporize the second refrigerant fluid, said outdoor heat exchanger also being connected in fluid communication with the second compressor for return of the vaporized second refrigerant fluid to the second suction port.

4. The cascade heat pump system of claim 1 or 3 wherein the first refrigerant fluid is relatively lower in specific gravity than the second refrigerant fluid.

5. The cascade heat pump system of claim 4 wherein the first refrigerant fluid is selected from the group consisting of R-12, and R-22.

6. The cascade heat pump of claim 4 wherein the second refrigerant fluid is selected from the group consisting of R-13B1, R-32, R-502, and R-504.

7. The cascade heat pump system of claim 1 or 3 further comprising a subcooler disposed to provide heat transfer between the vaporized second refrigerant fluid and the condensed second refrigerant fluid.

8. The cascade heat pump system of claim 2 or 3 further comprising control means for selectively operating the first and second compressors in the first, second, or third modes, said control means comprising
  a. means for sensing a demand for heating water; and
  b. means for sensing a temperature conditioning demand in the comfort zone, said control means being operative to effect the first mode if there is a demand for heating water and for cooling the comfort zone, or to effect the second mode if there is a demand for heating water and there is no cooling demand in the comfort zone, or to effect the third mode if there is a heating demand in the comfort zone.

9. The heat pump system of claim 8 wherein the control means are operative to select the third mode only when there is no water heating demand.

10. The heat pump system of claim 1 or 3 wherein the tri-fluid heat exchanger first and second passages comprise tubing interconnected with common fin material which define the air passages.

11. A method for selectively heating water with heat from relatively cold outdoor ambient air using a heat pump system operable in cascade fashion, and heating or cooling air supplied to a comfort zone, comprising the steps of
  a. in a first mode:
    i. compressing a vaporized first refrigerant fluid;
    ii. condensing the compressed first refrigerant fluid by providing heat transfer with water, thereby heating the water;
    iii. expanding and reducing the pressure of the condensed first refrigerant fluid;
    iv. vaporizing the expanded first refrigerant fluid by heat transfer with air supplied to cool a comfort zone;
  b. in a second mode including above steps (i) through (iii), the further steps of:
    iv. compressing a vaporized second refrigerant fluid;
    v. condensing the compressed second refrigerant fluid by heat transfer with the first refrigerant fluid, thereby vaporizing the first refrigerant fluid;
    vi. expanding and reducing the pressure of the condensed second refrigerant fluid;
    vii. vaporizing the expanded second refrigerant fluid by heat transfer with outdoor ambient air; and
  c. in a third mode, including the above steps in (b), (iv), (vi), and (vii), and in order after step (b) (iv), the further step of condensing the compressed second refrigerant fluid by heat transfer with air supplied to heat the comfort zone.

12. The method of claim 11 further comprising the steps of:
  a. sensing the demand for heating water;

b. sensing the temperature conditioning demand in the comfort zone; and
c. operating the system:
   i. in a first mode if there is a demand for heating water and for cooling the comfort zone; or
   ii. in the second mode if there is a demand for heating water and there is no demand for cooling the comfort zone; or
   iii. in the third mode if there is a demand for heating the comfort zone, but no water heating demand.

13. The method of claim 11 wherein the first refrigerant fluid is relatively lower in specific gravity than the second refrigerant fluid.

14. The method of claim 13 wherein the first refrigerant fluid is selected from the group consisting of R-12, and R-22 and the second is selected from the group consisting of R-13B1, R-32, R-502, and R-504.

15. The method of claim 11 wherein heat transfer between the first and second refrigerant fluids and air supplied to the comfort zone is effected in a common tri-fluid heat exchanger.

* * * * *